(12) United States Patent
Mori et al.

(10) Patent No.: US 8,006,930 B2
(45) Date of Patent: Aug. 30, 2011

(54) REEL

(75) Inventors: Yasuhiro Mori, Kanagawa (JP); Teruo Ashikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 306 days.

(21) Appl. No.: 11/797,829

(22) Filed: May 8, 2007

(65) Prior Publication Data

US 2008/0277519 A1    Nov. 13, 2008

(30) Foreign Application Priority Data

May 11, 2006    (JP) .................................. 2006-132334

(51) Int. Cl.
B65H 75/18    (2006.01)

(52) U.S. Cl. .................... 242/608.8; 242/348; 242/609.4

(58) Field of Classification Search .................. 242/348, 242/348.2, 608, 608.8, 609, 609.4, 610.4, 242/611.1
See application file for complete search history.

(56) References Cited

U.S. PATENT DOCUMENTS

| | | | | |
|---|---|---|---|---|
| 5,318,239 A * | 6/1994 | Posso | ........................ | 242/608.8 |
| 6,349,015 B1 * | 2/2002 | Hayashi | ........................ | 360/132 |
| 6,474,582 B2 * | 11/2002 | Zwettler et al. | ............ | 242/348.2 |
| 6,651,917 B2 * | 11/2003 | Momoi et al. | ................ | 242/348 |
| 6,857,591 B2 * | 2/2005 | Hiraguchi et al. | ............ | 242/348 |
| 6,955,322 B1 * | 10/2005 | Vanderheyden | ........... | 242/608.8 |
| 7,104,486 B2 * | 9/2006 | Hiraguchi | .................. | 242/338.1 |
| 7,168,655 B2 * | 1/2007 | Morita | ........................ | 242/610.4 |
| 7,293,733 B2 * | 11/2007 | Hoge | ............................ | 242/348 |
| 7,401,750 B2 * | 7/2008 | Hiraguchi | .................. | 242/611.1 |
| 7,407,126 B2 * | 8/2008 | Hiraguchi | .................. | 242/338.1 |
| 2005/0194491 A1 * | 9/2005 | Hatano | ...................... | 242/608.8 |
| 2005/0236512 A1 * | 10/2005 | Hiraguchi | ................. | 242/608.8 |

FOREIGN PATENT DOCUMENTS

| | | |
|---|---|---|
| JP | 2005-339634 | 12/2005 |
| JP | 2005-339668 A | 12/2005 |

OTHER PUBLICATIONS

Office Action dated May 11, 2010 for Japanese Patent Application No. 2006-132334.

* cited by examiner

*Primary Examiner* — William A Rivera
(74) *Attorney, Agent, or Firm* — Sughrue Mion, PLLC

(57) ABSTRACT

A reel is provided that may raise the rigidity of the hub, and suppress flange deformation that is caused by winding tension of recording tape. The reel is provided with: a cylindrical hub on which recording tape may be wound; a top flange extending integrally to the hub from a peripheral edge at one end portion of the hub; a bottom flange, including a bottom wall that has had a reel plate fixed thereto, the bottom flange being welded to a portion of the hub at the opposite end of the hub to the end of the top flange, the welding site being within the region where the reel plate is fixed.

12 Claims, 12 Drawing Sheets

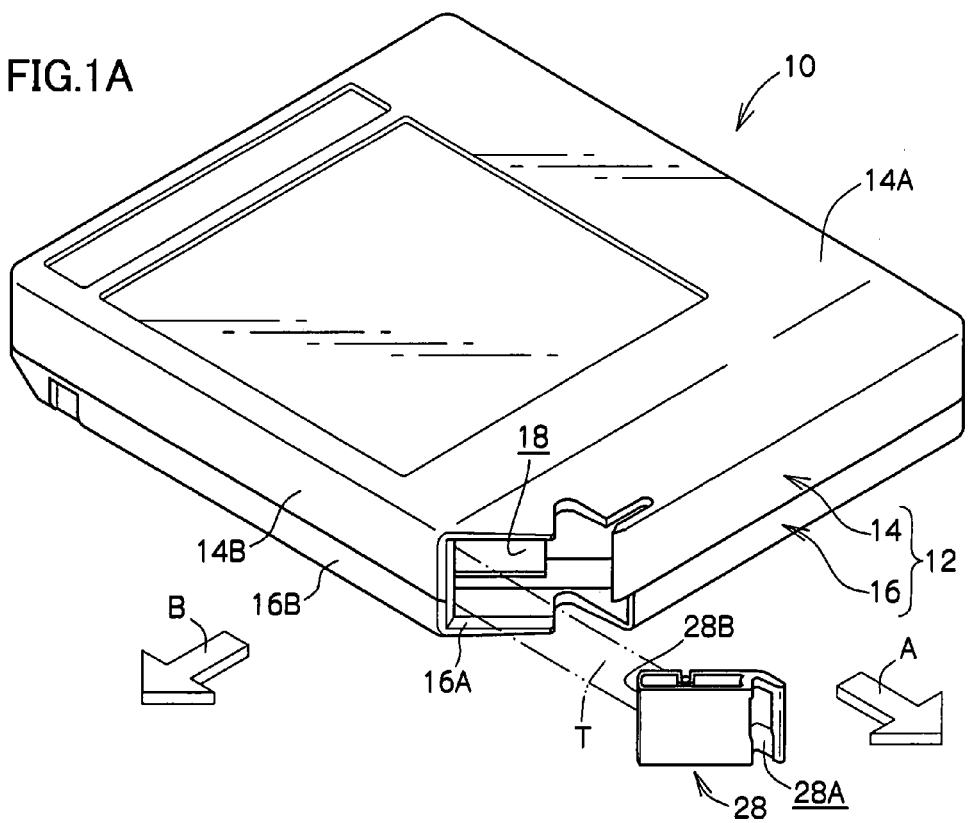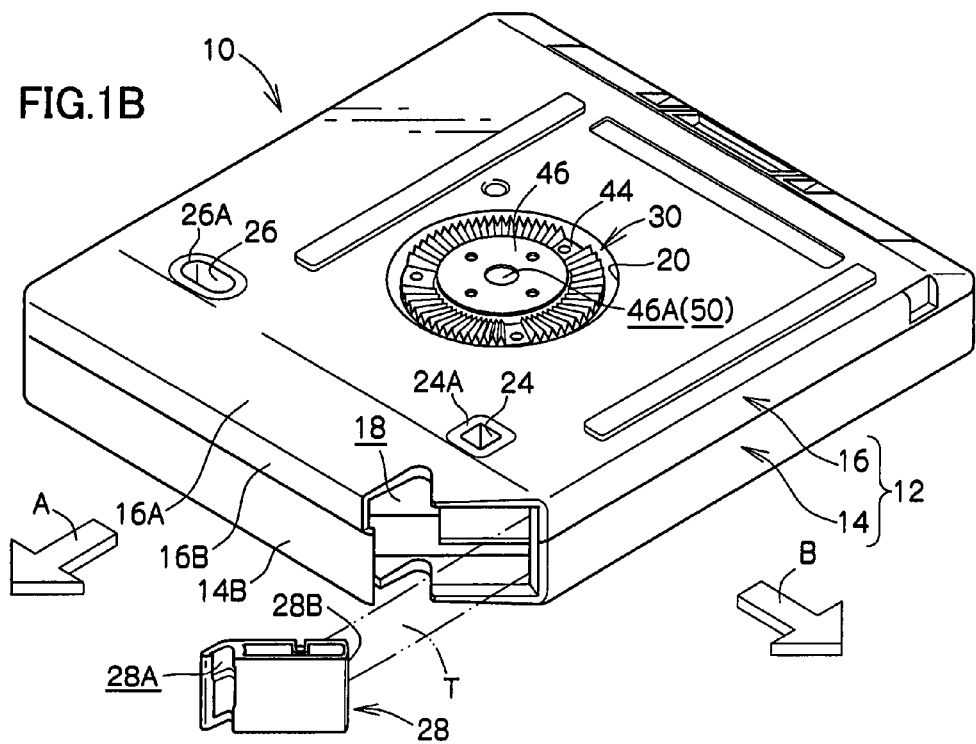

REEL

CROSS-REFERENCE TO RELATED APPLICATION

This application claims priority under 35 U.S.C 119 from Japanese Patent Application No. 2006-132334, the disclosure of which is incorporated by reference herein.

BACKGROUND OF THE INVENTION

1. Field of the Invention

The present invention relates to a reel for winding recording tape thereon, such as magnetic tape or the like mainly used as a computer recording and reproduction medium.

2. Description of the Related Art

Conventionally, recording tape cartridges are known for winding recording tape, such as magnetic tape of the like used as a data recording/reproducing medium (data backup) such as for computers, onto a synthetic resin reel, with a single of these reels being stored in a case. These recording tape cartridge reels are, for example, formed by integrally forming a bottom flange and a hub, and welding an annular top flange at the top peripheral surface of the hub.

In such a configuration of reel, deformation of the hub due to the winding tension of the recording tape thereon is prevented by forming reinforcement ribs on the hub, and there has been a proposal to try and prevent deformation of the top flange and the bottom flange by such a cause in this way (see, for example, Japanese Patent Application Laid-Open (JP-A) No. 2005-339668). However, there is a limit to the amount by which the rigidity can be raised by the formation of reinforcement ribs. That is to say, there is further room for improvement in increasing the rigidity of a hub with respect to winding tension generated when carrying out winding of recording tape.

To address this, the present invention has been made in the light of the above circumstances and provides a hub whose rigidity may be raised, and which may suppress deformation of flanges caused by winding tension from recording tape.

SUMMARY OF THE INVENTION

A first aspect of the invention is a reel including: a cylindrical hub, for winding recording tape thereon; a top flange, extending integrally to the hub from a peripheral edge at one end portion of the hub; a bottom flange, including a bottom wall that has had a reel plate fixed thereto, the bottom flange being welded to a portion of the hub at the opposite end of the hub to that of the top flange, the welding site being within a region where the reel plate is fixed.

According to the above aspect, when the bottom flange, with the bottom wall that has had the reel plate fixed thereto, is welded to the hub integrally formed with the top flange, welding is undertaken with welding sites within the region of the reel plate. Therefore, the force trying to deform the hub due to the winding tension of the recording tape may be suppressed by the reel plate. Accordingly, the rigidity of the hub may be increased, and the deformation of the top flange and the bottom flange may be suppressed.

In the above aspect, an engaging portion may be formed on the bottom flange, and a portion to be engaged that engages with the engaging portion may be formed at the portion of the hub at the opposite end to that of the top flange.

According to such an aspect, by the engaging of the engaging portion and the portion to be engaged, positioning may be made of the hub relative to a reel gear that may be formed as a ring-shape at the outer peripheral side of the reel plate. Accordingly, the accuracy of the coaxial locating of the reel gear and the hub may be increased.

In the above aspect, the engaging portion and the portion to be engaged may be the welding site.

By such an aspect, since the engaging portion and the portion to be engaged that are used for positioning are the welding site, the rigidity of the hub may be increased.

In the above manner, according to the present invention, a reel may be provided in which the rigidity of the hub may be increased, and deformation of the flanges caused by winding tension of the recording tape may be suppressed.

BRIEF DESCRIPTION OF THE DRAWINGS

Exemplary embodiments of the present invention will be described in detail based on the following figures, wherein:

FIG. 1A is an outline perspective diagram of a recording tape cartridge, as seen from above;

FIG. 1B is an outline perspective diagram of a recording tape cartridge, as seen from below;

DETAILED DESCRIPTION OF THE INVENTION

Explanation will now be given of details of an embodiment of the best mode of the present invention, with reference to an embodiment shown in the diagrams. First explanation will be given of the outline configuration of a recording tape cartridge 10. For ease of explanation, the direction of loading into a drive device of the recording tape cartridge 10 is shown by the arrow A, and this is designated as the front direction (front side). Also, the direction orthogonal to the direction of arrow A, shown by the arrow B, is designated as the right direction (right side) of the recording tape cartridge 10.

Figure 2:
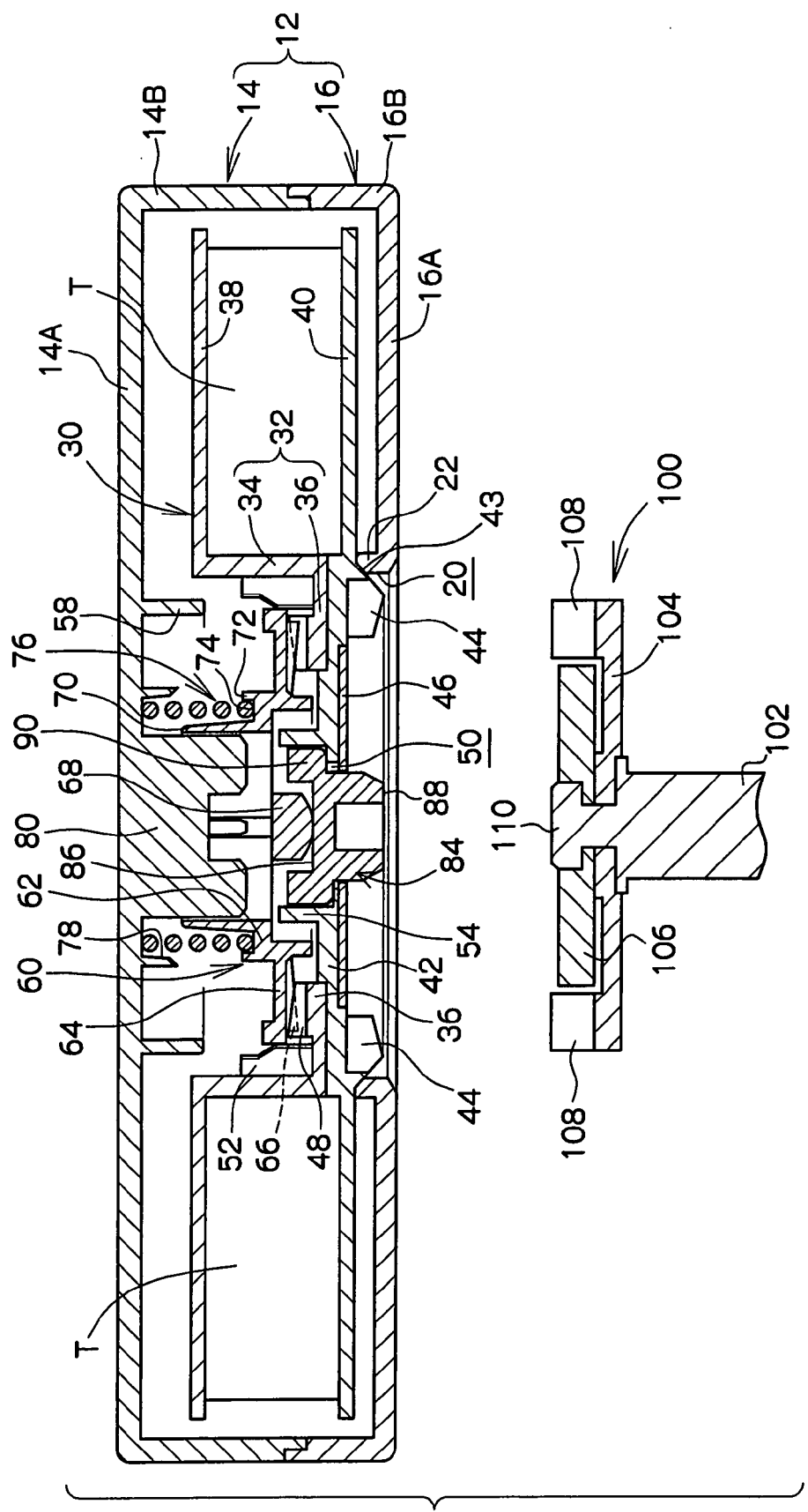
FIG. 2 is an outline cross-sectional diagram of when a recording tape cartridge is in a rotation locked position.
Figure 3:
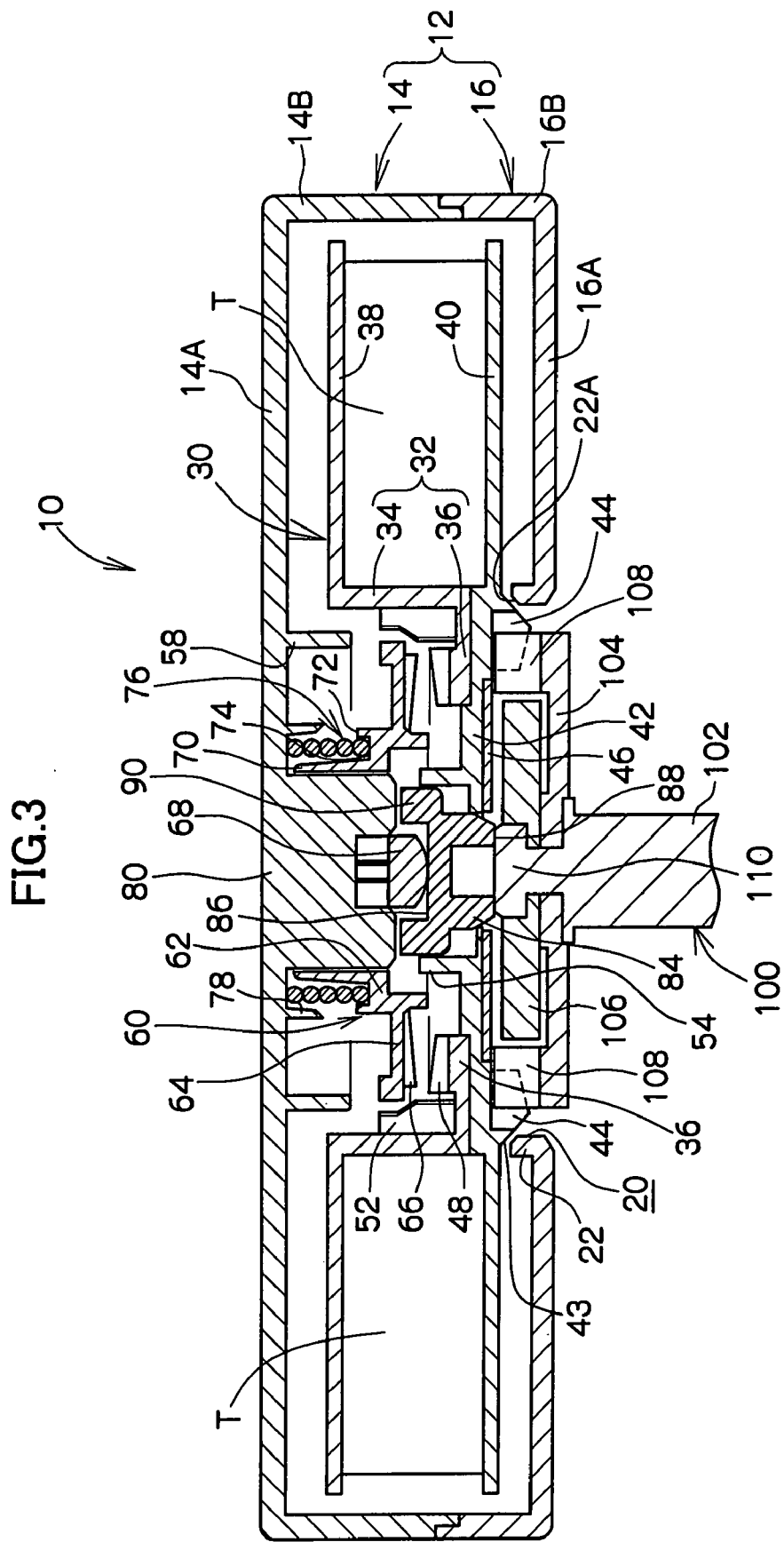
FIG. 3 is an outline cross-sectional diagram of when a recording tape cartridge is in a rotation permitting position.
Figure 4:
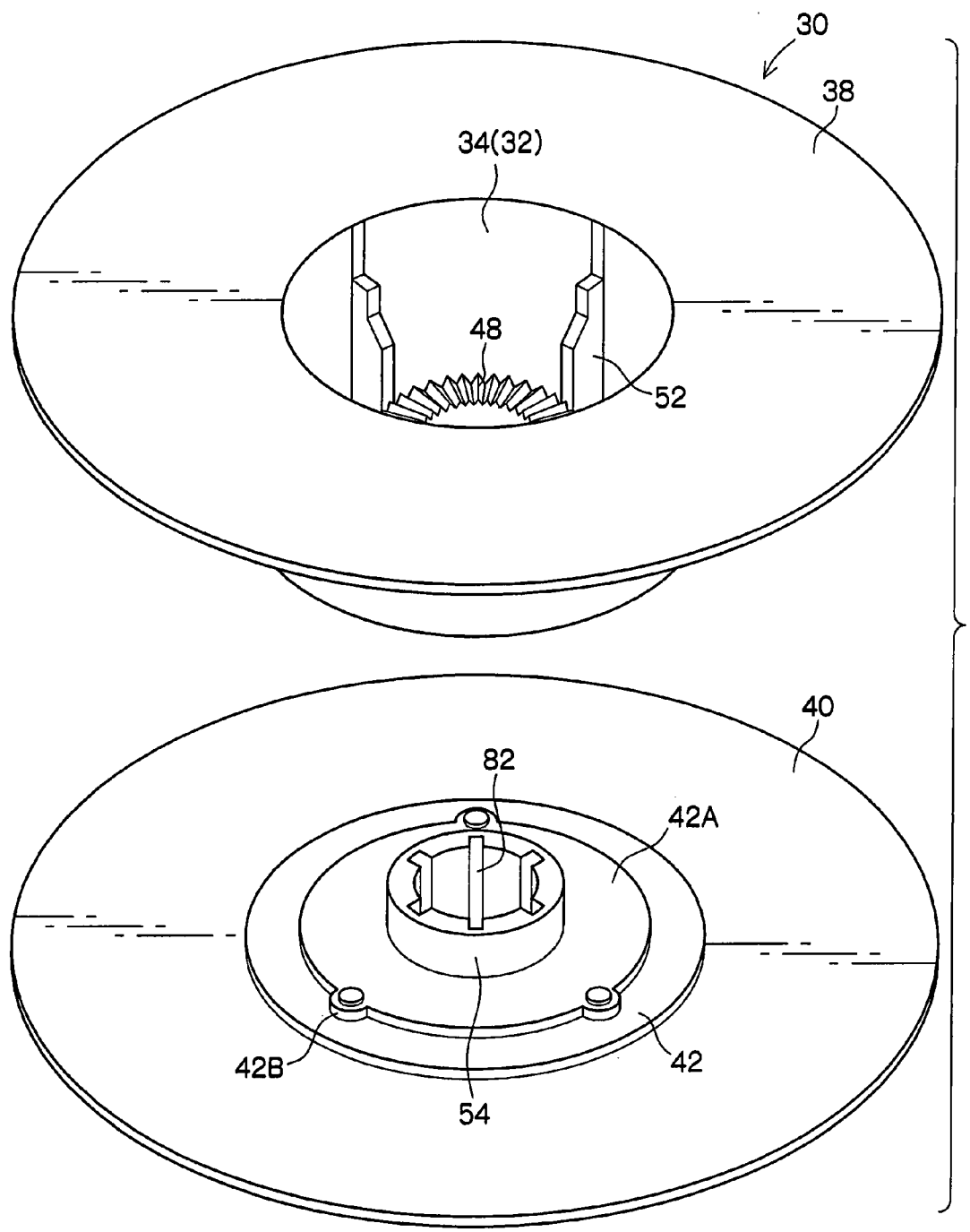
FIG. 4 is an outline exploded perspective diagram of a reel, as viewed from above.
Figure 5:
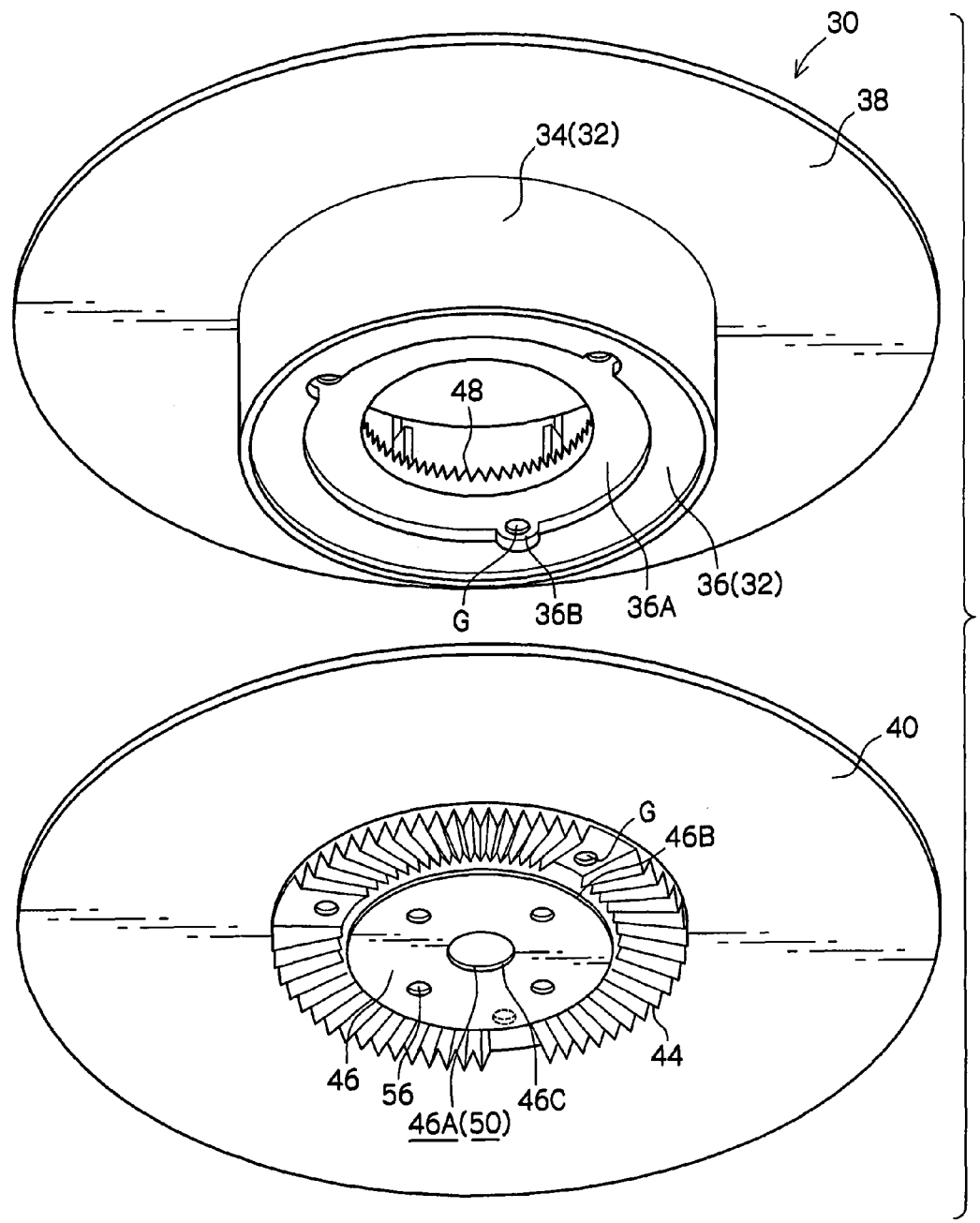
FIG. 5 is an outline exploded perspective diagram of a reel, as viewed from below.

The recording tape cartridge 10 has a case 12, as shown in FIGS. 1 to 3. The case 12 is configured by an upper case 14 and a lower case 16, these being joined together. Specifically, the upper case 14 is configured such that a substantially frame-shaped peripheral wall 14B projects down from along the outer edge of a top panel 14A that is substantially rectangular in plan view. The lower case 16 is configured such that a peripheral wall 16B projects up from along the outer edge of a bottom panel 16A that has a shape substantially corresponding to that of the top panel 14A. The case 12 is formed in a substantial box shape, with the upper case 14 and the lower case 16 being joined together by ultrasonic welding or screws or the like, in a state in which the open end of the peripheral wall 14B and the open end of the peripheral wall 16B abut each another.

At a corner portion of the case 12 at the leading edge in the direction of loading into a drive device, the top panel 14A, the peripheral wall 14B, the bottom panel 16A and the peripheral wall 16B are respectively cut away, such that an opening 18 is formed, inclined with respect to the loading direction. Also a gear opening 20 is provided in the substantially central portion of the bottom panel 16A, the gear opening 20 being circular and pierced through the bottom panel 16A for exposing a reel gear 44, which will be described later. An annular rib 22 projects toward the inner side of the case 12 at an outer edge of the gear opening 20 on the bottom panel 16A, and is for positioning a reel 30, described later, and for preventing dust ingress.

Moreover, a pair of positioning holes 24, 26 are opened in a vicinity of the front end of the outer surface of the bottom panel 16A of the case 12. The pair of positioning holes 24, 26 are pouch shaped and provided within projections (not illustrated) which upstand from the bottom panel 16A toward the interior of the case 12, and are disposed separated from one another along the dotted line in the direction B. The positioning hole 24, which is the positioning hole closer to the opening 18, is formed in a substantially square shape, as viewed from the bottom, and circumscribes a positioning pin of a drive device. The positioning hole 26 is an elongated hole, whose longitudinal direction runs along the above dotted line, and whose width corresponds to the diameter of a positioning pin. It is configured such that when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within a drive device.

The portions of the bottom panel 16A around the positioning holes 24, 26 are reference surfaces 24A, 26A that are finished so as to be smoother than the other portions (designed surfaces) of the bottom panel 16A. When the positioning pins are inserted into the positioning holes 24, 26, the reference surfaces 24A, 26A abut reference surfaces of a drive device which are provided around the positioning pins. In this way, the vertical direction positioning of the recording tape cartridge 10 within the drive device is carried out.

As shown in FIGS. 2 and 3, a single reel 30, which will be described later, is rotatably accommodated within the case 12. A recording tape T, of magnetic tape or the like, is wound on the reel 30, and, as shown in FIG. 1, a leader block 28, which serves as a leader member, is attached to the distal end of the magnetic tape T. The leader block 28 is, when the recording tape cartridge 10 is not being used, accommodated and held at the inside of the opening 18 of the case 12. In this state, the leader block 28 closes the opening 18, and prevents entry of dust and the like into the case 12.

An engaging recess 28A is formed in the distal end of the leader block 28. In the drive device, when the magnetic tape T is pulled-out, a pull-out portion (not illustrated), engages with the engaging recess 28A, and by doing so the tape T is pulled out of the case 12 and guided to a take-up reel (not illustrated) of the drive device. Moreover, the end surface of the leader block 28, at the side opposite to the side of the engaging recess 28A, is an arc-shaped surface 28B, and by fitting the arc-shaped surface 28B into the take-up reel, the arc-shaped surface 28B forms a portion of the take-up surface around which the magnetic tape T is taken-up.

Next, a restricting member used for preventing rotation of the reel 30 when the reel 30 is not in use will be described. As shown in FIGS. 4 to 7, 10 and 11, a reel hub 32, which configures an axially central portion of the reel 30, is provided in the reel 30. The reel hub 32 has a cylindrical portion 34, around which the magnetic tape T is wound, and an annular extension portion 36 that integrally extends out at a constant width from a lower end portion of the cylindrical portion 34 towards the center of the reel hub 32. The width W of the annular extension portion 36 (see FIG. 7) is wide enough so that an engagement gear 48 and standing ribs 52, to be described later, may be formed.

An annular recess portion 36A, serving as an engagement receiving portion, is formed with a given depth at the bottom face of the annular extension portion 36, at the side of the reel hub 32 center. Plural (three in the figure) widened recess portions 36B are formed at specific intervals in the annular recess portion 36A, widening out the recess in circular arc shapes. Gates G, which were the pouring holes of resin material, are formed in these widened recess portions 36B. Also, at the peripheral edge at a top portion of the reel hub 32, a top flange 38 extends integrally out toward the outside in the radial direction, coaxially thereto. That is, the reel hub 32 and the top flange 38 are such that they may be molded with resin material as a single piece.

A bottom flange 40 with a reel plate 46, described later, fixed thereto is joined (welded) to a bottom end portion of the reel hub 32. As shown in FIGS. 4, 5 and 8 to 11, the bottom flange 40 has an external diameter that is the same as the external diameter of the top flange 38, and a bottom wall 42 is formed with substantially the same diameter as the reel hub 32 at an axial portion of the bottom flange 40. An annular protrusion portion 42A is formed at a specific height on the top face of the annular protrusion portion 42A, the annular protrusion portion 42A serving as an engaging portion to engage with the annular recess portion 36A. Plural (three in the figure) widened protrusion portions 42B are formed at specific intervals on the annular protrusion portion 42A, to fit into the widened recess portions 36B.

Also, as shown in FIGS. 8 to 11, as ribs for use when welding, plural (nine in the figure) energy directors 41 (referred to below as "ED") protrude at even intervals from the top surface of the annular protrusion portion 42A, inside the region where the reel plate 46 is present (between the outer peripheral edge portion 46B and the inner peripheral portion 46C). Therefore, when welding the bottom face of the annular extension portion 36 of the reel hub 32 to the bottom flange 40, the widened recess portions 36B and the widened protrusion portions 42B are fitted together, and the annular recess portion 36A and the annular protrusion portion 42A are fitted together, and the ED 41 are welded by ultrasonic waves generated by a horn (not illustrated). Due to this the reel hub 32 may be positioned relative to the bottom flange 40 (and the later described reel gear 44), while welding the annular recess portion 36A and the annular protrusion portion 42A, and the recording tape T is able to be wound on the outer peripheral surface of the cylindrical portion 34 of the reel hub 32.

Figure 9:
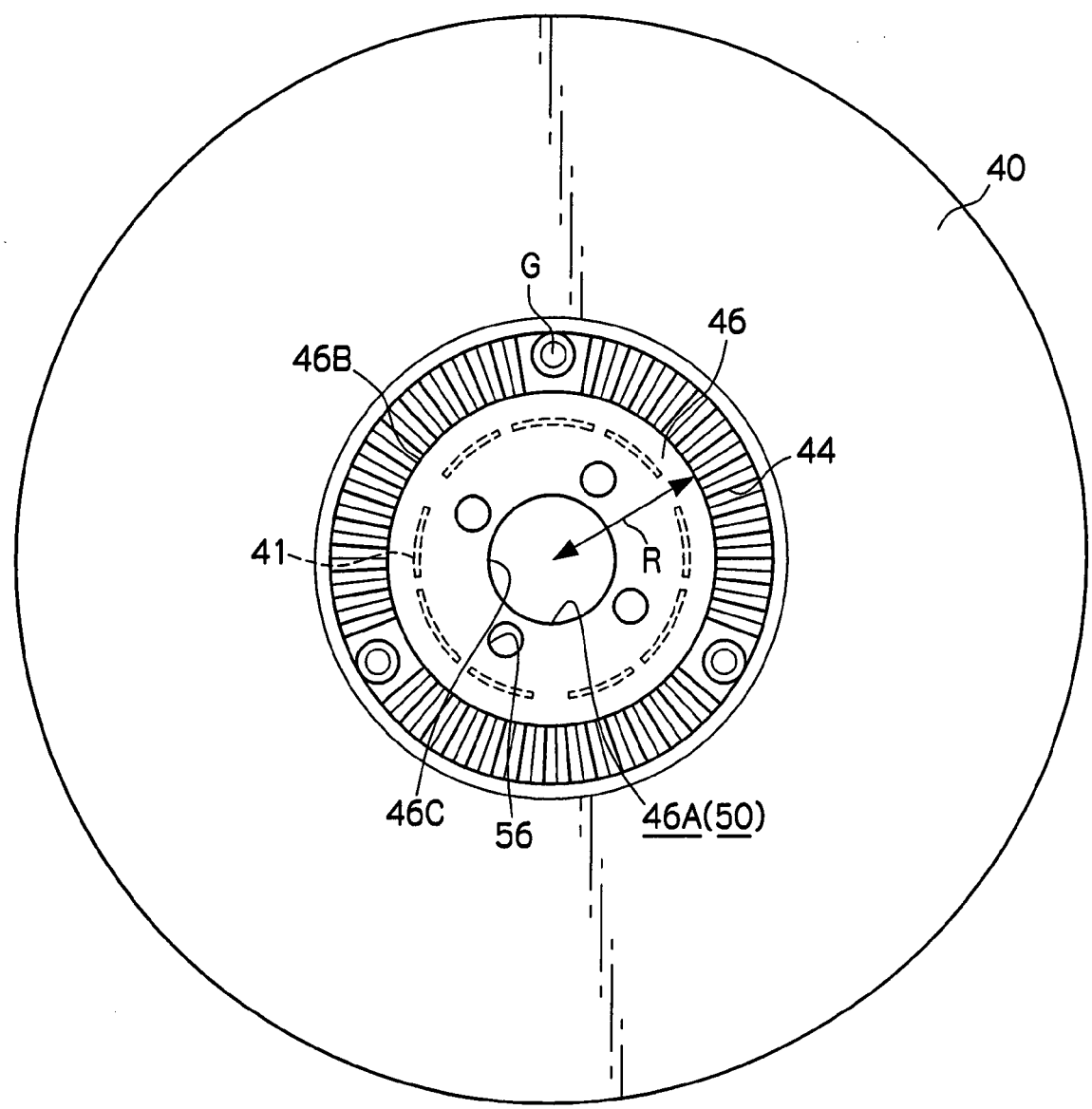
FIG. 9 is an outline bottom view of a bottom flange.

Further, as shown in FIG. 9, the reel gear 44 is formed as a ring-shape on the bottom surface (outer surface) of the bottom wall 42 on the bottom flange 40, so as to be coaxial to the reel hub 32 when the reel hub 32 is joined. The reel gear 44 is engageable with a drive gear 108 provided at the distal end of a rotation shaft 100 of a drive device shown in FIGS. 2 and 3. Tips of teeth of the reel gear 44 protrude in the downward direction below the bottom face of the bottom flange 40, and troughs between the teeth are located above the bottom face of the bottom flange 40, the outer end portions in the radial direction of each of the teeth are connected with a taper portion 43 from a high direction central portion of the tooth to the trough of the tooth. Also, plural (three in the figure) gates G that were resin pouring holes are formed at specific locations on the reel gear 44.

Figure 10:
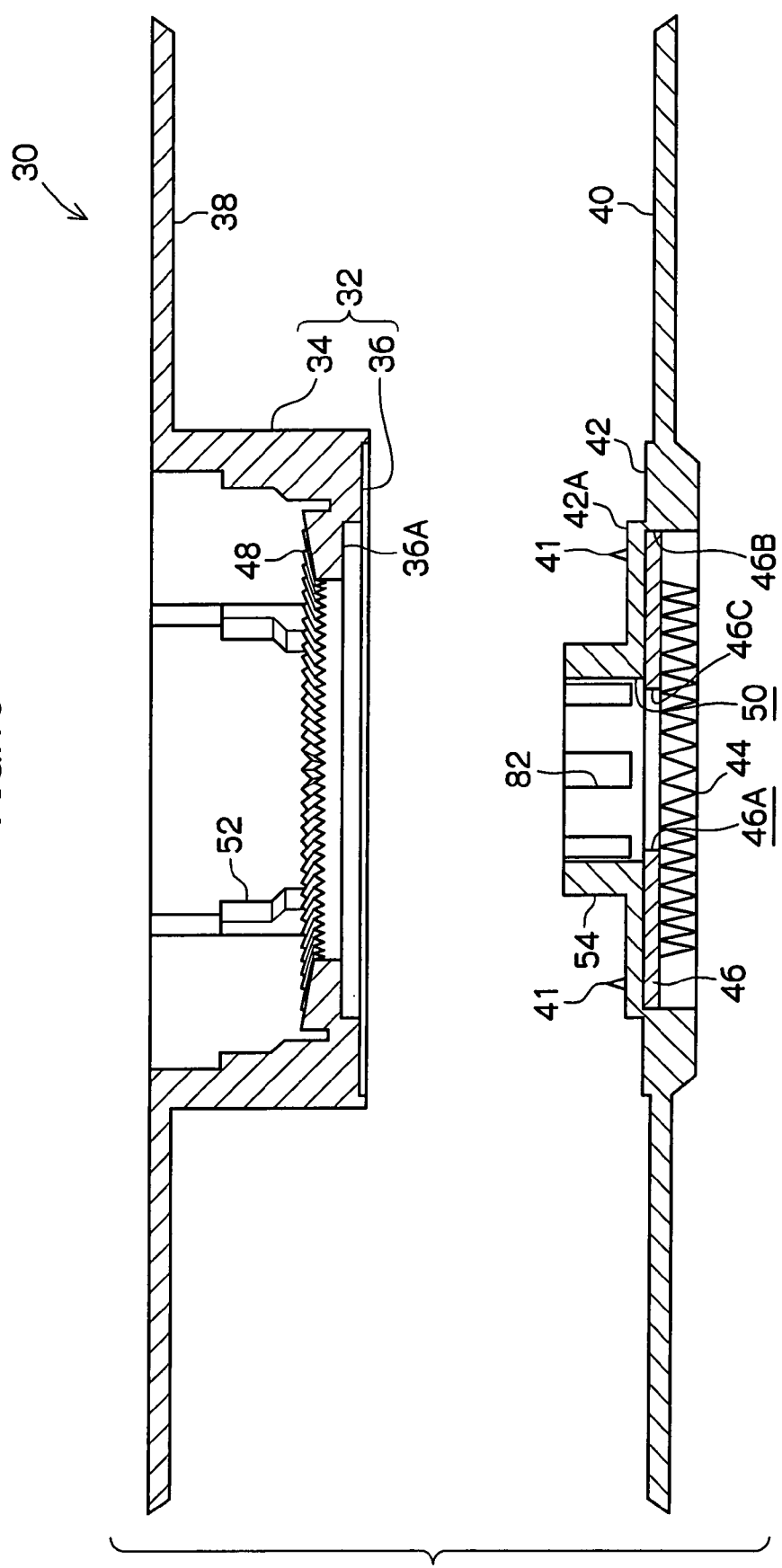
FIG. 10 is an outline exploded cross-sectional diagram of a reel.
Figure 11:
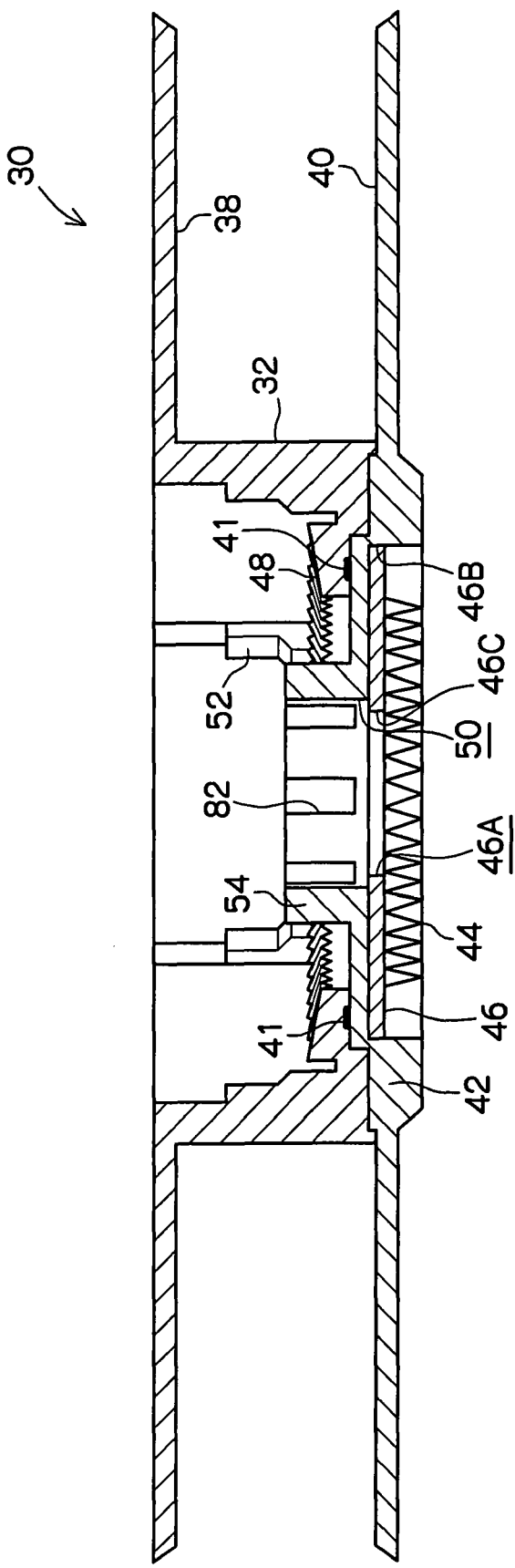
FIG. 11 is an outline cross-sectional diagram of a reel.

Furthermore, a reel plate 46 that is an annular metal plate made from magnetic material is insert molded, fixed integrally and coaxially to the bottom wall 42 of the bottom flange 40 at the inside of the reel gear 44. Therefore, the reel plate 46 is provided with plural (four in the figure) small holes 56, as step portions for resin material to flow into act as retainers. Furthermore, a through hole 50 is formed at the center (axial portion) of the bottom wall 42 in the bottom flange 40, through which a later described clutch member 84 is inserted, and a short cylinder shaped clutch boss portion 54 is provided extending upwards around the edge portion of the through hole 50. Explanation will be given of the clutch boss portion 54 at the same time as explanation of the later described clutch member 84. At the axial portion of the reel plate 46 is a through hole 46A, and, as shown in FIGS. 10 and 11, the internal diameter of the through hole 46A is formed slightly smaller than the internal diameter of the through hole 50.

Figure 6:
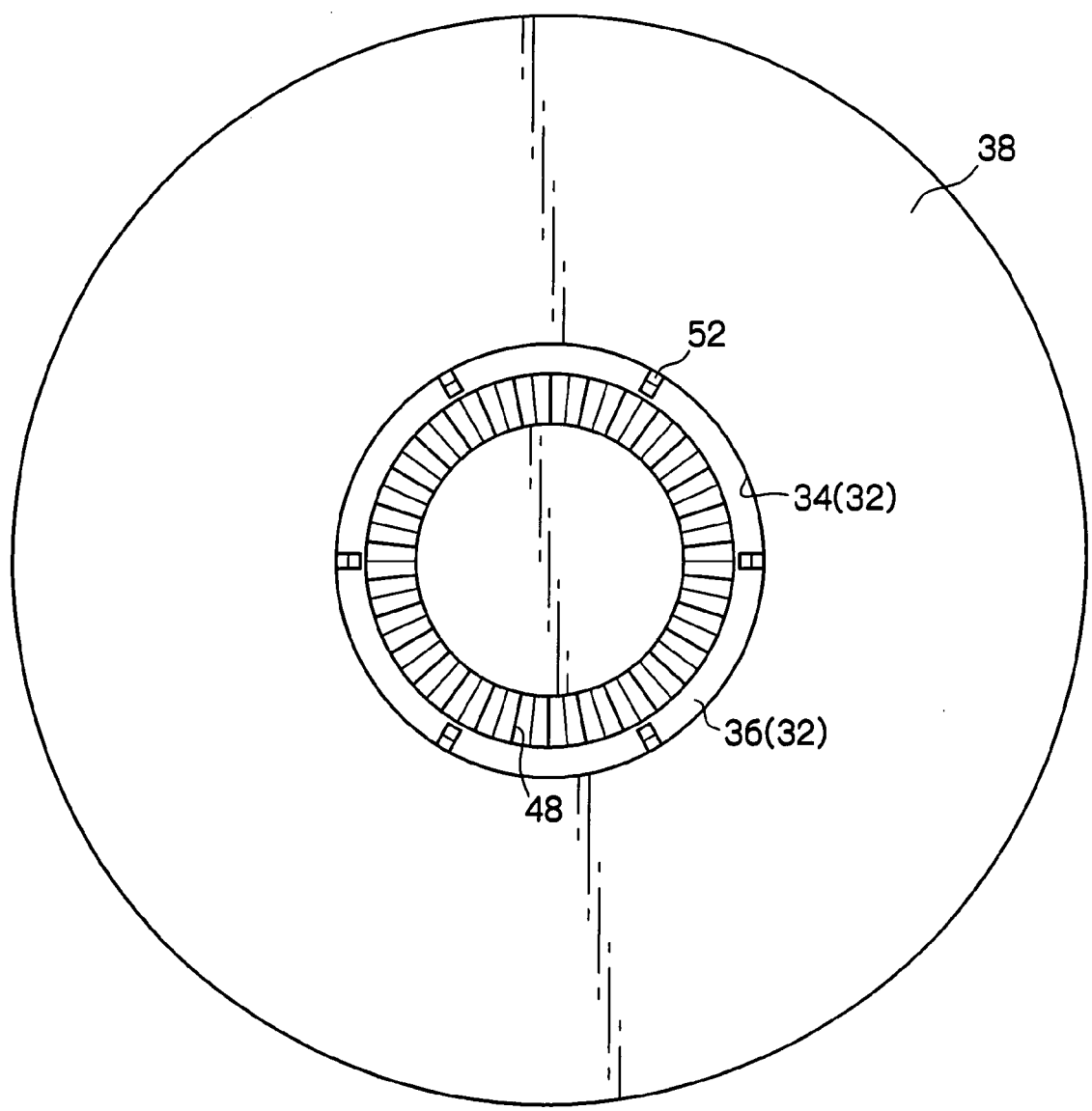
FIG. 6 is an outline plan view of a top flange and reel hub.
Figure 7:
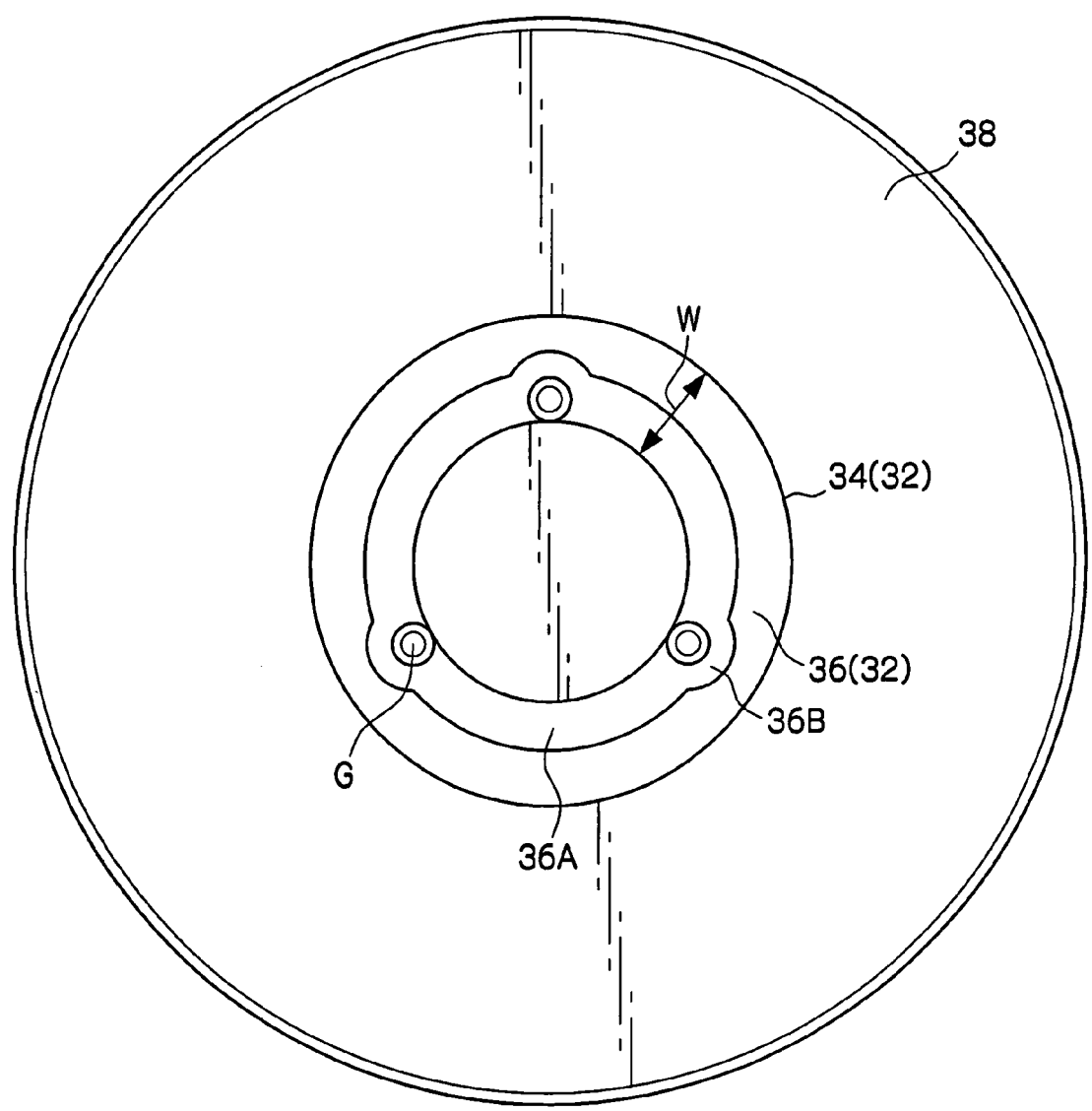
FIG. 7 is an outline bottom view of a top flange and reel hub.

Also, as shown in FIG. 6, the engagement gear 48 is formed as a ring shape, coaxial to the reel hub 32 on the upper surface of the annular extension portion 36 formed on the reel hub 32. The engagement gear 48 is engageable with a later described control gear 66 of a brake member 60. Also, at the outside in the radial direction of the engagement gear 48, plural (six in the figure) standing ribs 52 are provided at even intervals in the circumferential direction, continuous to the internal surface of the cylindrical portion 34 and the upper surface of the annular extension portion 36. The engagement gear 48 is positioned to the inside of the reel gear 44 in the radial direction by the presence of these standing ribs 52. Explanation regarding the standing ribs 52 will be given at the same time as that of the brake member 60.

As shown in FIGS. 2 and 3, the reel 30 is accommodated in the case 12, and is placed on the annular rib 22 when not in use. Specifically, the reel 30 is such that the outside portion of the taper portion 43 at the bottom wall 42 abuts the top end face of the annular rib 22. The top end inner edges portion of the annular rib 22 has a taper surface 22A corresponding to the taper portion 43, and restricts movement of the reel 30 in the radial direction. It is a configuration such that dust and the like are prevented from penetrating from this portion.

In this state, the reel 30 is positioned overall within the case 12, with the reel gear 44 and the reel plate 46 exposed through the gear opening 20 (see FIG. 1B). That is, the reel gear 44 may be exposed from the outside of the case 12 though the gear opening 20, even though the reel gear 44 does not protrude past the outer face (bottom face) of the bottom panel 16A. The through hole 50 may also be exposed at the gear opening 20 through the through hole 46A of the reel plate 46.

By the above configuration, operating, that is chucking and rotation driving, the reel 30 is possible from outside of the case 12. Also, in this operating state, a ring shaped restriction rib 58 that extends down from the top panel 14A intrudes into the upper portion of the cylindrical portion 34 of the reel 30. The restriction rib 58 is configured so that the outer peripheral surface thereof approaches and is adjacent to the inner peripheral surface of the cylindrical portion 34 (the reel hub 32), preventing rattling about of the reel 30 inside the case 12.

Furthermore, the recording tape cartridge 10 is provided with the brake member 60, serving as rotation prevention member for the reel 30 when the reel 30 is not in use. The brake member 60 has a base portion 62, and the base portion 62 is formed in substantially the shape of a shallow circular cylinder that is open toward the bottom. A flat plate portion 64 is formed in a ring shape at an intermediate portion in the axial direction on an outer peripheral portion of the brake member 60, extending towards the outside in the radial direction around the whole of the circumference of the brake member 60, and a movement restricting gear 66 is formed around the whole of the circumference at the bottom face of the flat plate portion 64. That is, the movement restricting gear 66 is formed overall in a ring shape, configured so as to be meshable with the engagement gear 48 of the reel 30.

Further, there is a sliding contact protrusion 68 at the axial portion of the bottom face of the base portion 62. The sliding contact protrusion 68 is formed with a substantially spherical surface on the leading edge portion, and undergoes approximately point contact with the later described clutch member 84. A cross-shaped protrusion 70 is formed with a substantially cross-shape groove in plan view at an internal portion thereof, standing up out of the top face of the base portion 62. Furthermore, there is also an annular rib 72 projecting up from the top surface of the base portion 62. The top surface of the base portion 62 between the annular rib 72 and the cross-shaped protrusion 70 is a spring seat surface 74 that contacts with one end portion of a later described compression coil spring 76.

Such a brake member 60 is able to move in the vertical direction (the reel 30 axial direction) within the cylindrical portion 34 of the reel hub 32. That is, the brake member 60 is such that it is able, by moving in the vertical direction, to obtain a meshing position (rotation locked position) in which the movement restricting gear 66 is meshed with the engagement gear 48 of the reel hub 32, and to obtain a position in which this meshing us released (rotation permitting position).

Also, a cross-shaped rib 80 protrudes in a downward direction from the top panel 14A of the case 12, so as to fit into the groove of the cross-shaped protrusion 70 of the brake member 60. The cross-shaped rib 80 has a rotation prevention shape of two mutually intersecting thin plate elements that, by meshing with the groove walls of the cross-shaped protrusion 70, prevent the rotation of the brake member 60 relative to the case 12. Therefore, the brake member 60 may prevent rotation of the reel 30 in the state in which the movement restricting gear 66 is meshed with the engagement gear 48 of the reel hub 32.

The cross-shaped rib 80 is able to maintain a state of fitting into the grooves for the entire movement stroke of the brake member 60 in the vertical direction, and is configured to function to guide the movement of the brake member 60 in the vertical direction. Furthermore, the brake member 60 is configured such that when in the rotation locked position, the brake member 60 is restricted in movement in the radial direction by the standing ribs 52 of the reel 30, and when the brake member 60 is in the rotation permitting position it does not interfere with the standing ribs 52 rotating with the reel 30.

That is to say, the standing ribs 52 are located to abut with an outer peripheral edge of the flat plate portion 64 of the brake member 60 when located in the rotation locked position, and upper portions of the standing ribs 52 are cut out, so as to have at least a certain value of clearance to the outer peripheral edge of the flat plate portion 64 when in the rotation permitting position. By doing so, not only is the reel directly restricted from moving by the case 12, but in the vicinity of the center of gravity of the reel 30, movement in the radial direction relative to the case 12 is restricted via the brake member 60, and the reel 30 is able to be stably loaded into a drive device with a vertical slot (with the reel 30 axis in the horizontal direction).

Furthermore, the compression coil spring 76, serving as biasing member in the broader sense, is placed between the spring seat surface 74 of the brake member 60 and the top panel 14A. The compression coil spring 76 has one end portion thereof abutting the spring seat surface 74 and the other end portion thereof abutting the top panel 14A. The other end portion is located on the inside of an annular wall 78 that protrudes from the top panel 14A at the outside of the cross-shaped rib 80, so that there is no displacement in the radial direction.

The brake member 60 is biased in the downward direction (the brake member 60 is caused to be in the rotation locked position) by the biasing force of the compression coil spring 76, and unintentional rotation of the reel 30 may be reliably prevented by the meshing of the movement restricting gear 66 with the engagement gear 48. Also, by such a biasing force, the reel 30 meshed at the engagement gear 48 with the brake member 60 is also biased in the downward direction, and abutted against the annular rib 22 so that there is no rattling around of the reel 30 within the case 12.

The clutch member 84 is provided in the recording tape cartridge 10 and serves as a releasing member operated from outside when releasing the locked state of the reel 30 due to the brake member 60. The clutch member 84, along with the meshing operation of the reel gear 44 with the drive gear 108, moves upwards pressed by a later described release protrusion 110, and is disposed between the bottom wall 42 of the reel 30 and the brake member 60.

That is, the clutch member 84 is formed substantially as a circular cylindrical column that is inserted into the through hole 50 of the through hole 46A, and the external diameter of the clutch member 84 is slightly smaller than the internal diameter of the through hole 46A of the reel plate 46, in other words also slightly smaller than the internal diameter of the through hole 50 that matches the internal diameter of the clutch boss portion 54. The top surface of the flat axial portion of the clutch member 84 is a sliding contact surface 86 that is in continuous contact with the sliding contact protrusion 68 of the brake member 60, and there is a pressing operation surface 88 that is a flat bottom surface that surrounds a thinning hole provided open to the downward side in the clutch member 84.

Also, the clutch member 84 is provided with rotation restricting ribs 90 that extend outside in a radial direction from the outer peripheral surface of the clutch member 84. Plural rotation restricting ribs 90 (six in the present embodiment) are provided at uniform intervals around the peripheral direction of the clutch member 84, and the rotation restricting ribs 90 are disposed in a radial arrangement as seen in plan view. The respective rotation restricting ribs 90 project further up than the sliding contact surface 86, so as to straddle (respectively connect) between the top end surface around the sliding contact surface 86 of the clutch member 84, and the outer peripheral surface in the vicinity of the top end surface of the clutch member 84.

The rotation restricting ribs 90 fit within respective rotation restricting grooves 82 recessed in the inter edge portion of the clutch boss portion 54 (see FIGS. 4, 8, 10, 11). That is, there are six of the rotation restricting grooves 82 provided at even intervals around the peripheral direction of the clutch boss portion 54, and the rotation restricting grooves 82 are open to the top at the top portion of the clutch boss portion 54. In this way, at the rotation restricting ribs 90, the clutch member 84 is able to move in the vertical direction, while being guided by the rotation restricting grooves 82 of the clutch boss portion 54.

Furthermore, even when the clutch member 84 moves upward to place the brake member 60 in the rotation permitting position, the rotation restricting ribs 90 maintain a state in which they are fitted within the rotation restricting grooves 82 of the clutch boss portion 54. By doing so, the clutch member 84 is not rotatable relative to the reel 30, and is configured so as to always rotate as one with the reel 30. Also, the clutch member 84 may be prevented from dropping out of the reel hub 32 by the rotation restricting ribs 90 together with the rotation restricting grooves 82, since each of the rotation restricting grooves 82 are closed at a lower portion of the clutch boss portion 54.

As shown in FIGS. 2 and 3, the rotation shaft 100 of a drive device is provided with a rotation axel 102, and at the top end of the rotation axel 102 there is a circular plate shaped rotation table 104 extending integrally therefrom. The drive gear 108 is formed in a ring shape at the top surface of the rotation table 104 at a peripheral edge portion thereof, the drive gear 108 being meshable with the reel gear 44 of the recording tape cartridge 10. Also, a substantially circular magnet 106 is disposed coaxially at the inside in the radial direction of the of the drive gear 108 at the top surface of the rotation table 104. The release protrusion 110 is formed at an axial portion of the rotation table 104, for abutting the pressing operation surface 88 of the clutch member 84.

Next, the operation of the above configuration of a recording tape cartridge 10 provided with a reel 30 will be explained. In the recording tape cartridge 10, when not in use, the brake member 60 is located in the rotation locked position with the movement restricting gear 66 meshed with the engagement gear 48, due to the biasing force of the compression coil spring 76. Therefore, the reel 30 is prevented from rotating relative to the case 12. In this state, the reel gear 44 of the reel 30 is exposed through the gear opening 20, and also the clutch member 84 may be seen from the gear opening 20 through the through hole 50 and the through hole 46A.

On the other hand, when the recording tape T is being used, the recording tape cartridge 10 is mounted into a drive device bucket (not illustrated) along the direction of arrow A. Then, when the recording tape cartridge 10 has been mounted to a predetermined depth, the bucket is lowered, and the rotation shaft 100 of the drive device approaches (moves upwards) relatively towards the gear opening 20 of the case 12 and holds the reel 30. Specifically, the rotation shaft 100 attracts and holds the reel plate 46 in a non contact manner using the magnet 106, while the drive gear 108 of the rotation shaft 100 meshes with the reel gear 44.

With the meshing of the reel gear 44 and the drive gear 108, along with the relative movement to the vicinity in the axial direction of the rotation shaft 100 relative to the case 12, the release protrusion 110 of the rotation shaft 100 abuts the pressing operation surface 88 of the clutch member 84 and the clutch member 84 is pushed up against the biasing force of the compression coil spring 76. By so doing, the brake member 60 that is abutting the clutch member 84 at the sliding contact protrusion 68 is also moved upward, and meshing of the movement restricting gear 66 of the brake member 60 with the engagement gear 48 is released.

That is, the brake member 60 is moved to the rotation permitting position relative to the reel 30. After this, when the rotation shaft 100 is further relatively moved upward, the reel 30 is lifted upwards with the clutch member 84 and the brake member 60 (without any relative displacement therebetween), and the brake member 60 reaches the rotation permitting position (relative to the case 12), and also the bottom flange 40 is separated from the annular rib 22 (from the taper surface 22A). By doing so, the reel 30 is raised in the case 12, and enters a state in which it does not contact the internal surfaces of the case 12 and is able to rotate.

At this time, by lowering the bucket, i.e. by lowering the recording tape cartridge 10 in the drive device, the respective locating pins of the drive device are inserted into each of the positioning holes 24, 26, and also the reference surfaces of the drive device abut each of the reference surfaces 24A, 26A of the case 12. The positioning of the recording tape cartridge 10 relative to the drive device in the horizontal and vertical directions is thus made. Then, the pulling mechanism of the drive device engages with the engaging recess 28A of the leader block 28, and pulls out the leader block 28 from the case 12, and guides the leader block 28 to the take up reel of the drive device.

The leader block 28 is fitted into the take up reel hub and the arc-shaped surface 28B of the leader block 28 configures a portion of the take up surface for taking up the recording tape T. In this state, when the leader block 28 rotated as one with the take up reel, the recording tape T is gradually wound up on the take up reel hub, while being pulled out of the case 12 through the opening 18. At this time the reel 30 of the recording tape cartridge 10 is synchronously rotated with the take up reel by transmission of rotational force of the rotation shaft 100 transmitted by the drive gear 108 meshing with the reel gear 44.

Then, the information is recorded on the recording tape T, or information that has been recorded on the recording tape T is reproduced, by a recording/reproducing head (not illustrated) disposed at a predetermined position along the path of the tape in the drive device. When doing so, the sliding contact protrusion 68 of the brake member 60 that is not rotatable relative to the case 12, is in sliding contact with the sliding contact surface 86 of the clutch member 84 that is rotating along with the reel 30 relative to the case 12. That is to say, in the state in which the reel gear 44 meshes with the drive gear 108, the clutch member 84 maintains an abutting relationship with the release protrusion 110 at the pressing operation surface 88, and maintains the movement restricting gear 66 in the rotation permitting position.

When the reel 30 is rotating, there is no relative rotation between the reel 30 together with the integrally rotating clutch member 84 and the rotation shaft 100 driving the reel 30, and it is configured such that there is mutual sliding contact between the pressing operation surface 88 and the release protrusion 110, and there is mutual sliding contact between the sliding contact surface 86 of the clutch member 84 and the sliding contact protrusion 68 of the brake member 60, which is not able to rotate relative to the case 12. In this manner, since there is no relative rotation between the rotation axel 102 and the clutch member 84, there is no problem of abrasion between the release protrusion 110 and the pressing operation surface 88.

When the recording of the information on the recording tape T, or the reproduction of information that was recorded on the recording tape T, has been concluded the recording tape T is rewound onto the reel 30, and the leader block 28 is retained in the vicinity of the opening 18 of the case 12. Then, the bucket in which the recording tape cartridge 10 has been loaded is raised. By doing so, the abutting of the release protrusion 110 with the pressing operation surface 88 of the clutch member 84 is released, and the clutch member 84 is moved downward, together with the brake member 60, by the biasing force of the compression coil spring 76 (while maintaining the abutting state).

In this way the movement restricting gear 66 of the brake member 60 meshes with the engagement gear 48, and the brake member 60 returns to the rotation locked position, restricting rotation of the reel 30 relative to the case 12. Furthermore, accompanying the actuation of the movement of the brake member 60 and the clutch member 84 by the biasing force of the compression coil spring 76, the reel 30 moves in a downward direction, and the bottom flange 40 of the reel 30 is caused to abut the annular rib 22, returning the reel gear 44 to the initial position, exposed via the gear opening 20. In this state, the recording tape cartridge 10 is ejected from the drive device (bucket).

Figure 8:
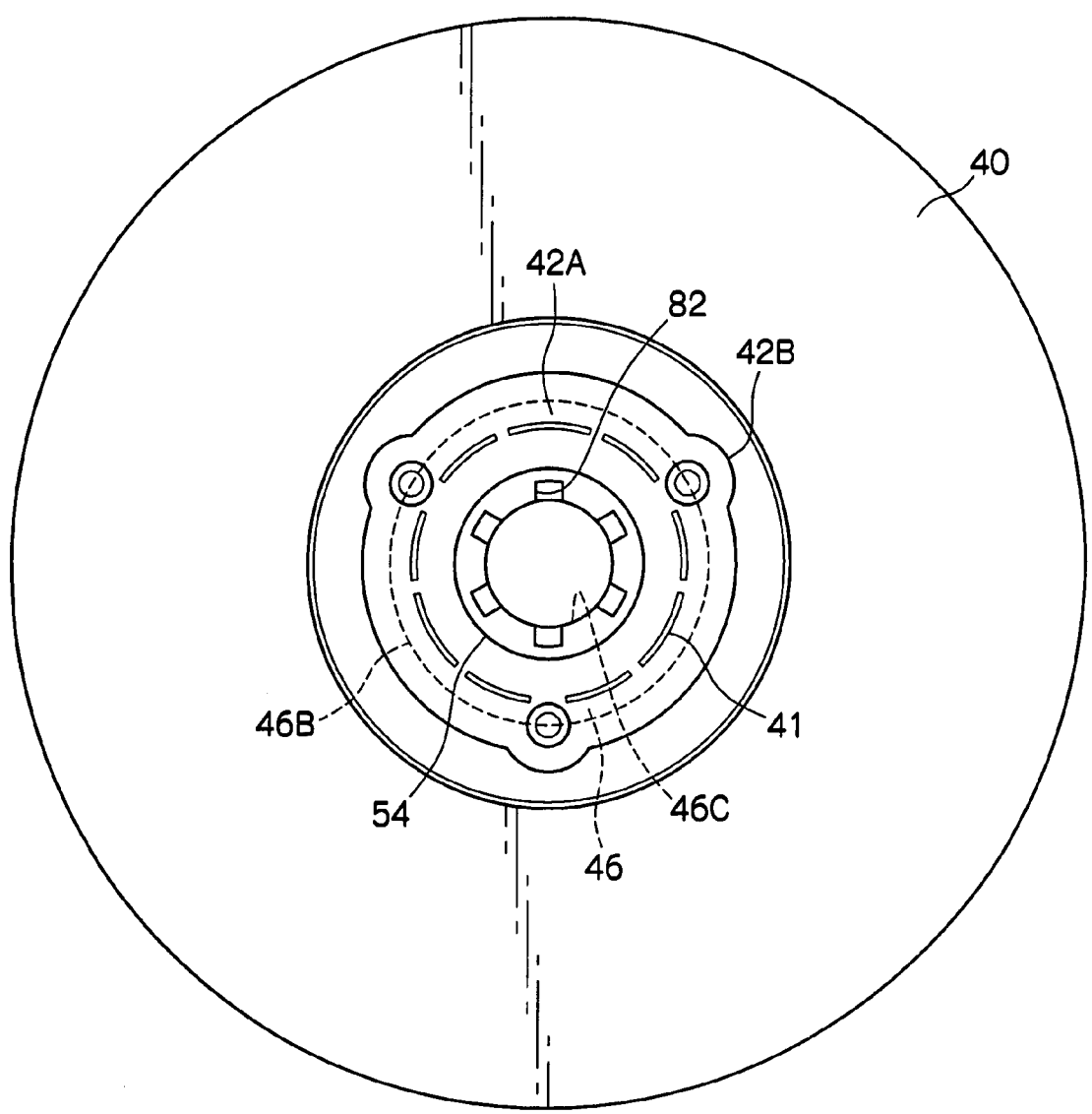
FIG. 8 is an outline plan view of a bottom flange.

Here, the reel 30 is produced with the integrally formed top flange 38 and reel hub 32, and in addition the bottom flange 40 with the bottom wall 42 is welded to the reel hub 32 integrally formed with the top flange 38. The reel plate 46 is insert molded in advance at the bottom wall 42. That is to say, the when the bottom flange 40 is welded to the reel hub 32 the reel plate 46 is already in a state of being fixed to the bottom wall 42. The welding sites (the positions where the ED 41 are provided) are within the reel plate 46 region, as shown in FIGS. 8 and 9, at the annular protrusion portions 42A (annular recess portions 36A), in between the outer peripheral edge portion 46B and the inner peripheral portion 46C of the reel plate 46.

In this way the ED 41 are provided at the top surfaces of the annular protrusion portions 42A within the region of the reel plate 46, and it is configured such that the reel plate 46 is located directly below the weld locations (welding sites) of the reel hub 32 (annular recess portions 36A) and the bottom flange 40 (annular protrusion portions 42A), so even if the reel hub 32 tries to deform with the winding tension of the recording tape T, the high rigidity metal reel plate 46 may restrain such deformation. It follows that deformation of the bottom flange 40 (bending) may be restrained, and therefore deformation of the reel hub 32 may be suppressed (the rigidity may be increased), so deformation of the top flange 38 (bending) may be suppressed.

Figure 12:
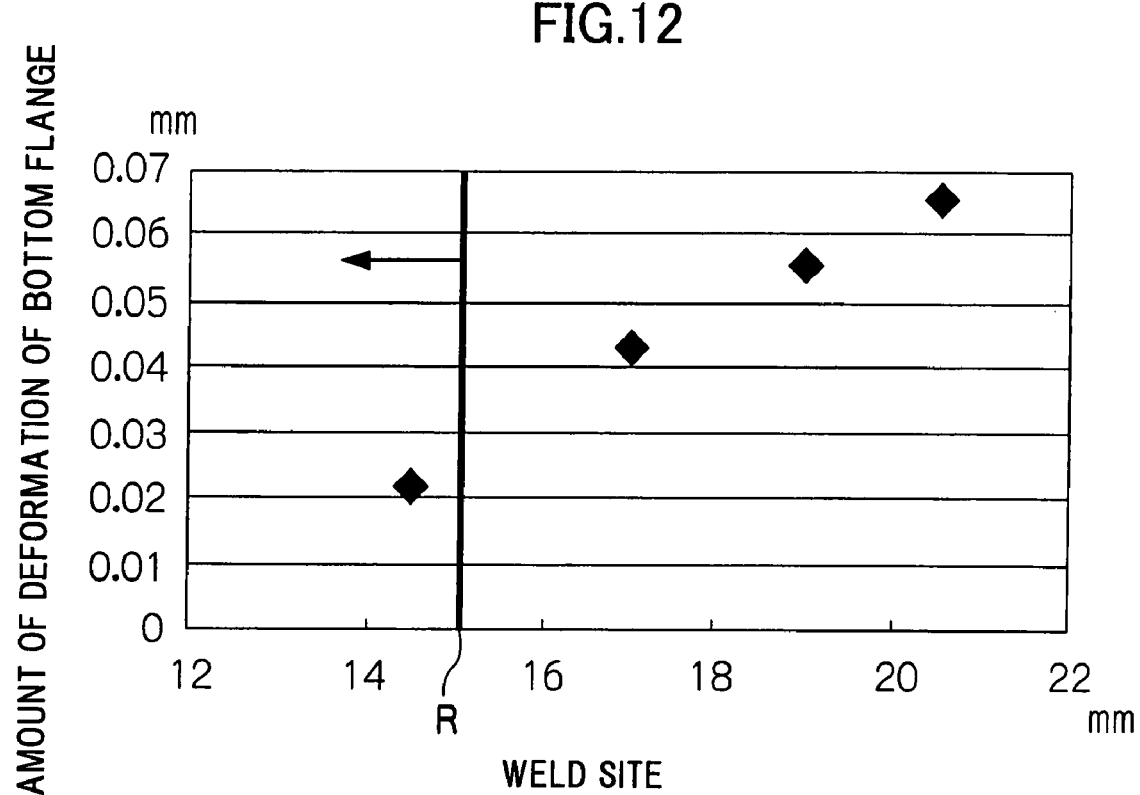
FIG. 12 is a graph showing the relationship between a weld position, of a bottom flange to a reel hub, and the amount of deformation of the bottom flange.

FIG. 12 shows a graph of the relationship between the weld locations (weld sites) of the between the reel hub 32 and the bottom flange 40 measured from the rotational axis of the reel 30, and the amount of deformation of the bottom flange 40. In the present embodiment, the radius R (see FIG. 9) of the reel plate 46 is set to 15 mm. It is clear from this graph that the by having the weld sites in the region where the reel plate 46 is located (between the outer peripheral edge portion 46B and the inner peripheral portion 46C), the amount of deformation of the bottom flange 40 may be reduced (the angle of bending may be made small).

That is, when the reel hub 32 and the bottom flange 40 are welded at such positions, the occurrence of problems where the top flange 38 or the bottom flange 40 distort and touch the recording tape T, due to the winding tension generated when winding up the recording tape T on the reel hub 32, may be prevented. It is clear from the graph that, even when it is difficult to weld the reel hub 32 and the bottom flange 40 within the region of the reel plate 46, due to the internal structure of the reel hub 32 or the like, by welding as close as possible to the outer peripheral edge portion 46B of the reel plate 46, a certain degree of deformation reduction effect may be obtained.

Further, when welding the reel hub 32 and the bottom flange 40, the annular protrusion portion 42A and widened protrusion portions 42B formed on the bottom wall 42 of the bottom flange 40 are fitted into the annular recess portion 36A and widened recess portions 36B formed in the annular extension portion 36 of the reel hub 32. Due to this the reel hub 32 may be positioned relative to the reel gear 44 formed on the bottom wall 42 of the bottom flange 40. In this way, if the positioning can be made directly below the reel plate 46, even if the clearance (for example 0.05 mm or less) between the annular recess portion 36A (including the widened recess portions 36B) and the annular protrusion portion 42A (including the widened protrusion portions 42B) is made small, deformation (bending) may be prevented of the top flange 38 and the bottom flange 40 due to deformation due to winding tension of the reel hub 32. Therefore, the precision of the positioning of the flange 32 with respect to the hub 44 may be increased, and the reel gear 44 and the reel hub 32 may be maintained coaxial to an appropriate degree.

In the recording tape cartridge 10 of the above embodiment, the ED41 for welding is provided at the bottom flange 40, but may be provided either at the top flange 38 or the bottom flange 40. Further, the recording tape cartridge 10 of the above embodiment is configured with the leader block 28 as the leader member, but the recording tape cartridge 10 is not limited to the above embodiment. For example, a configuration with a circular rod leader pin (not illustrated) as the leader member is possible, and a configuration using a dust exclusion member which closes and opens across the opening 18 (a slide door or the like that moves along a predetermined straight line or arc, not illustrated) is possible. Furthermore, it is sufficient that the recording tape T is a long tape-shaped information recording-reproducing medium that is able to record information or reproduce information that has been recorded, and the recording tape cartridge 10 (reel 30) may be applied to any format of recording and reproducing.

What is claimed is:

1. A reel comprising:
   a cylindrical hub, for winding recording tape thereon;
   a top flange, extending integrally to the hub from a peripheral edge at one end portion of the hub; and
   a bottom flange, comprising a bottom wall having a reel plate fixed thereto, the bottom flange being welded at a welding site, to a portion of the hub at the opposite end of the hub to that of the top flange, the welding site being within a region where the reel plate is fixed,
   wherein the reel has a center axis about which the reel is configured to rotate,
   wherein the reel plate has an outer peripheral edge which is provided at a first distance from the center axis in a radial direction of the reel,
   wherein the welding site is provided at a second distance from the center axis in the radial direction of the reel which is smaller than the first distance, and
   wherein the reel plate is insert molded to the bottom wall before the welding of the bottom flange to the hub.

2. The reel according to claim 1, wherein an engaging portion is formed on the bottom flange, and an engaged portion that engages with the engaging portion is formed at the portion of the hub at the opposite end of the hub to that of the top flange.

3. The reel according to claim 2, wherein the engaging portion and the engaged portion are the welding site.

4. The reel according to claim 1, wherein the reel plate is an annular metal plate made from magnetic material.

5. The reel according to claim 1, wherein the reel plate is fixed coaxially and integrally to the bottom wall of the bottom flange by being insert molded.

6. The reel according to claim 1, wherein the reel plate is formed from a high rigidity component.

7. The reel according to claim 1, wherein the reel plate is an annular metal plate, and the region where the reel plate is fixed extends in the radial direction from an inner peripheral edge to an outer peripheral edge of the reel plate.

8. The reel according to claim 1, wherein a reel gear is provided on the bottom wall of the bottom flange and is configured to engage a drive gear of a drive device.

9. The reel according to claim 1, wherein a resin portion of a bottom face of an extension portion of the reel hub is welded to a resin portion of a top face of the bottom flange.

10. A reel comprising:
    a cylindrical hub, for winding recording tape thereon;
    a top flange, extending integrally to the hub from a peripheral edge at one end portion of the hub;
    a bottom flange, welded at a welding site, to a portion of the hub at the opposite end of the hub to that of the top flange; and
    a reel plate, fixed to a bottom wall of the bottom flange that is directly below the welding site of the bottom flange,
    wherein the welding site is positioned within an outer peripheral edge of the reel plate in a radial direction of the reel, and
    wherein the reel plate is insert molded to the bottom wall before the welding of the bottom flange to the hub.

11. The reel according to claim 10, wherein a reel gear is provided on the bottom wall of the bottom flange and is configured to engage a drive gear of a drive device.

12. The reel according to claim 10, wherein a resin portion of a bottom face of an extension portion of the reel hub is welded to a resin portion of a top face of the bottom flange.

* * * * *